Aug. 11, 1936.    C. E. EDWARDS    2,050,832
MACHINE FOR MAKING RETICULATED WIRE STRUCTURES
Filed Sept. 12, 1934    12 Sheets-Sheet 4

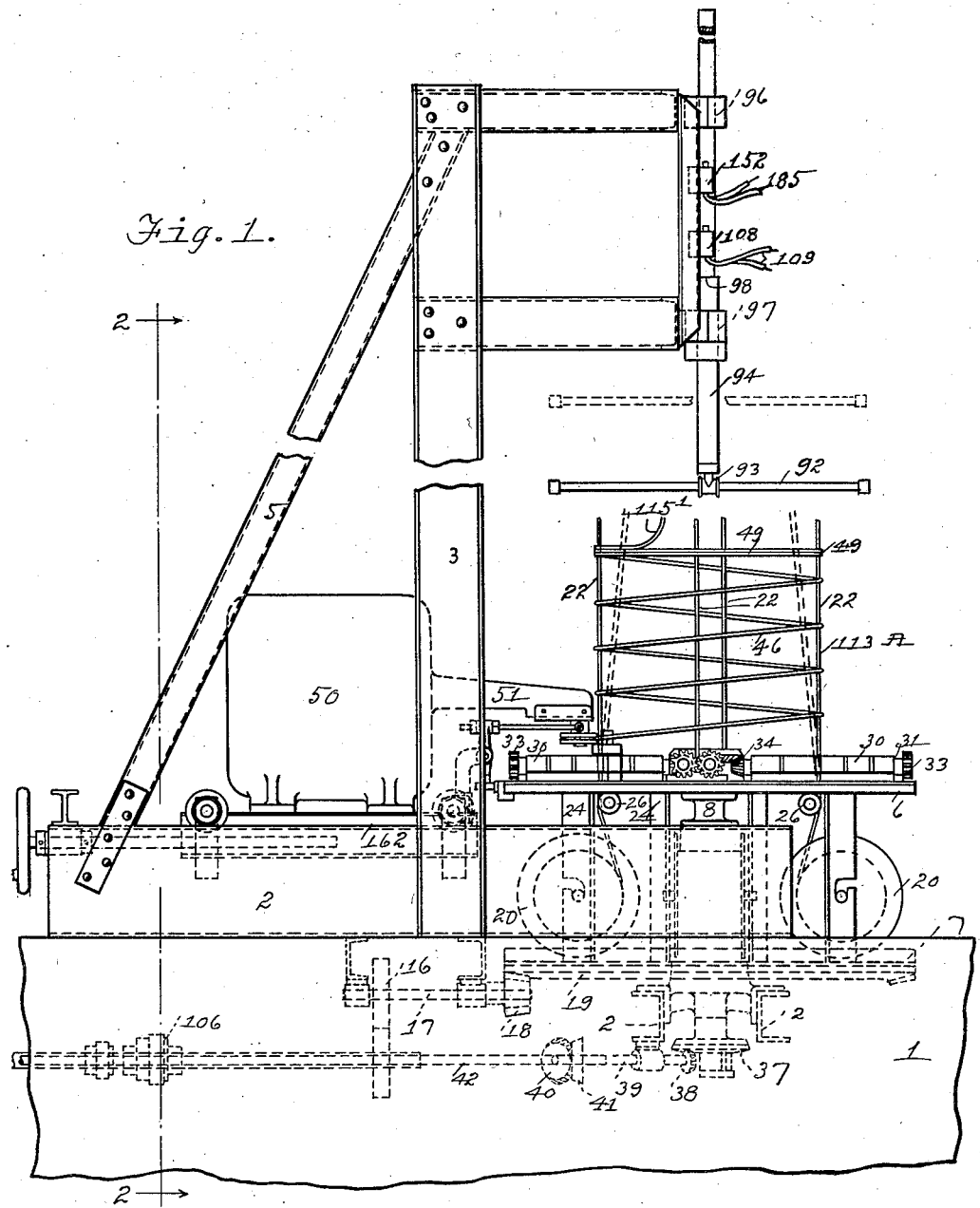

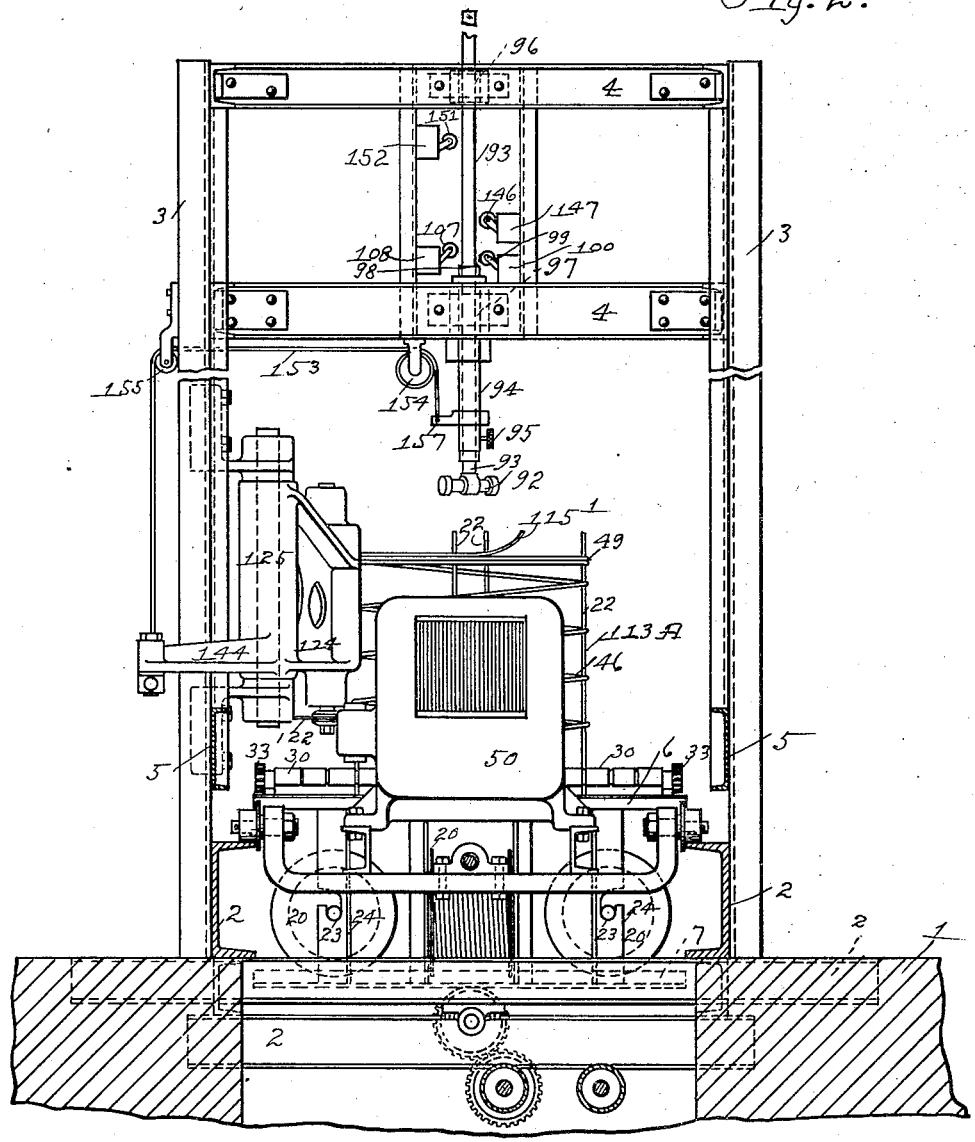

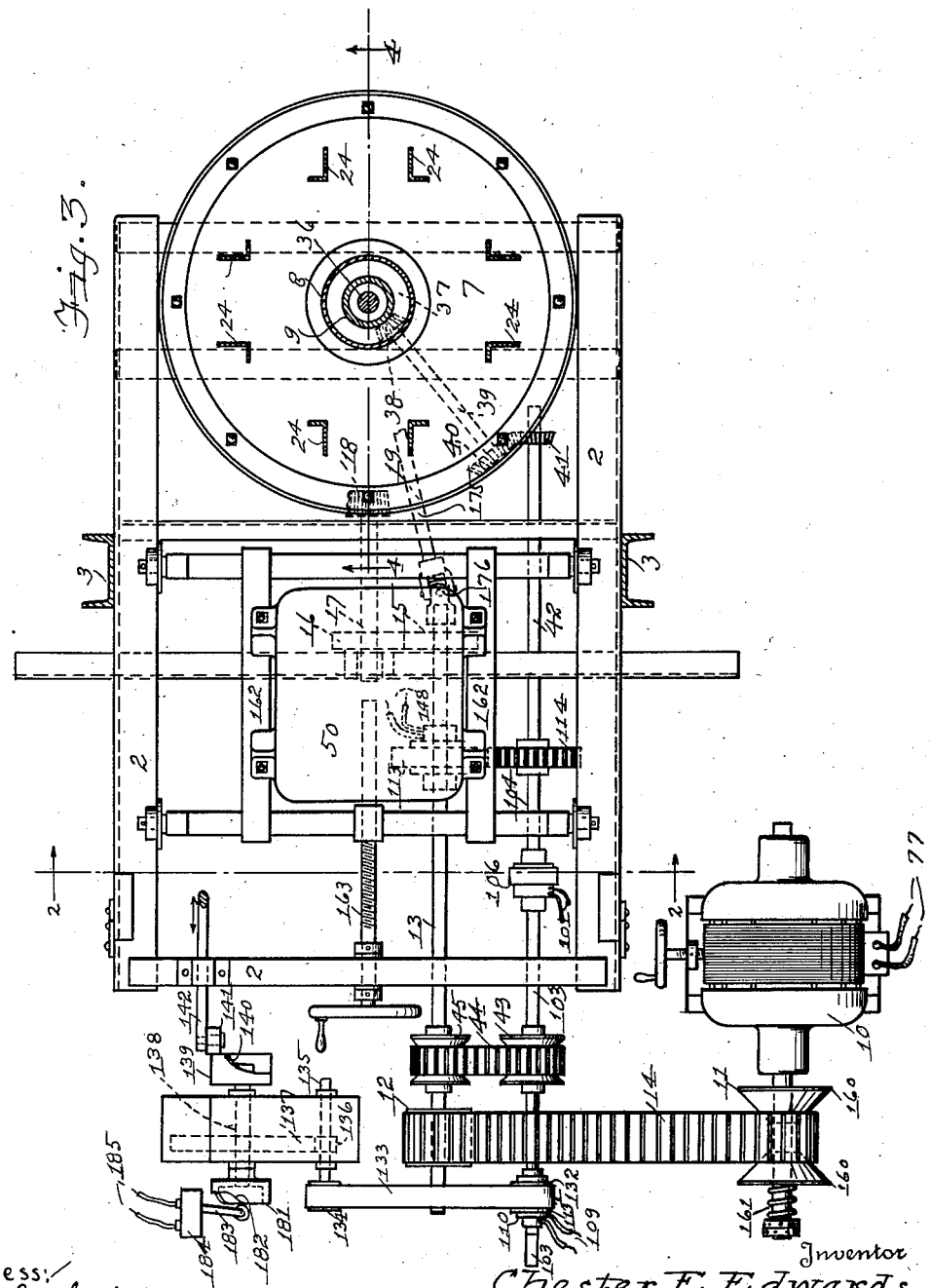

Witness: Geo. L. Chapel

Inventor
Chester E. Edwards
By Rice and Rice
Attorneys

Aug. 11, 1936.  C. E. EDWARDS  2,050,832
MACHINE FOR MAKING RETICULATED WIRE STRUCTURES
Filed Sept. 12, 1934  12 Sheets-Sheet 5
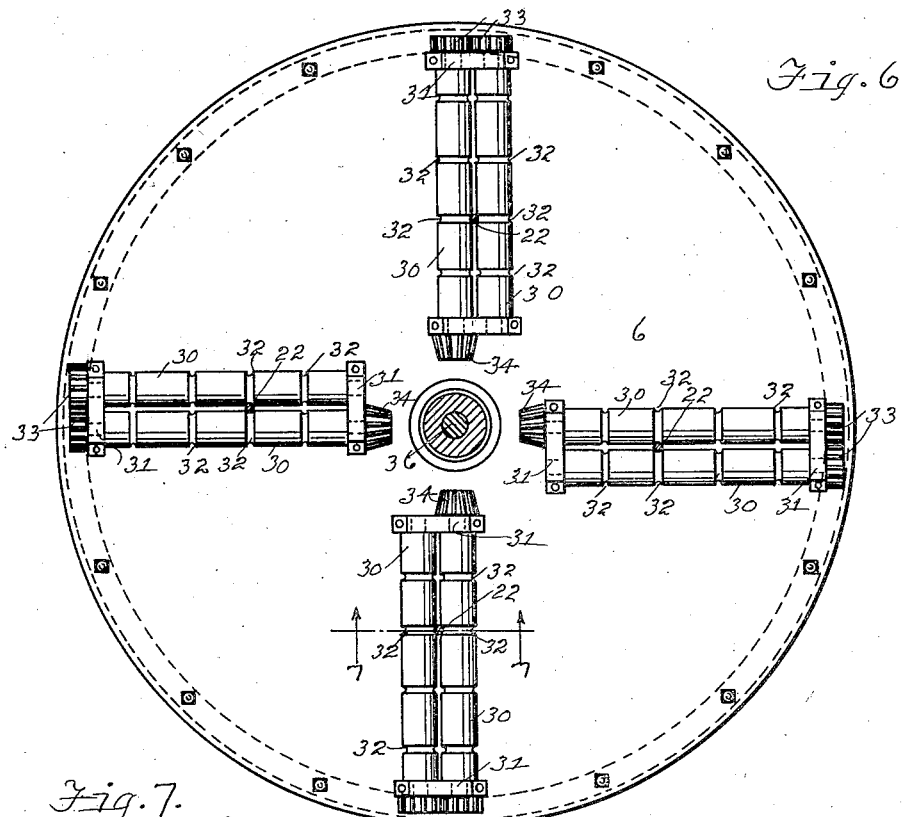
Fig. 6
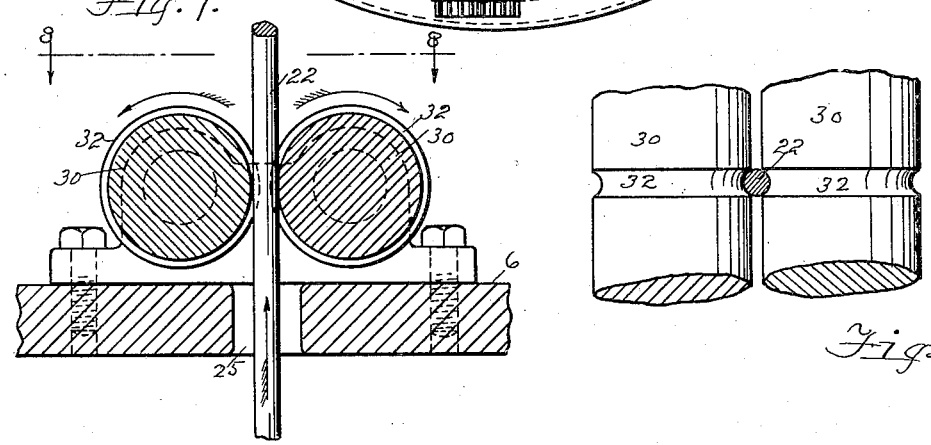
Fig. 7.
Fig. 8.
Witness:
Geo L. Chapel
Inventor
Chester E. Edwards
By Rice and Rice
Attorneys

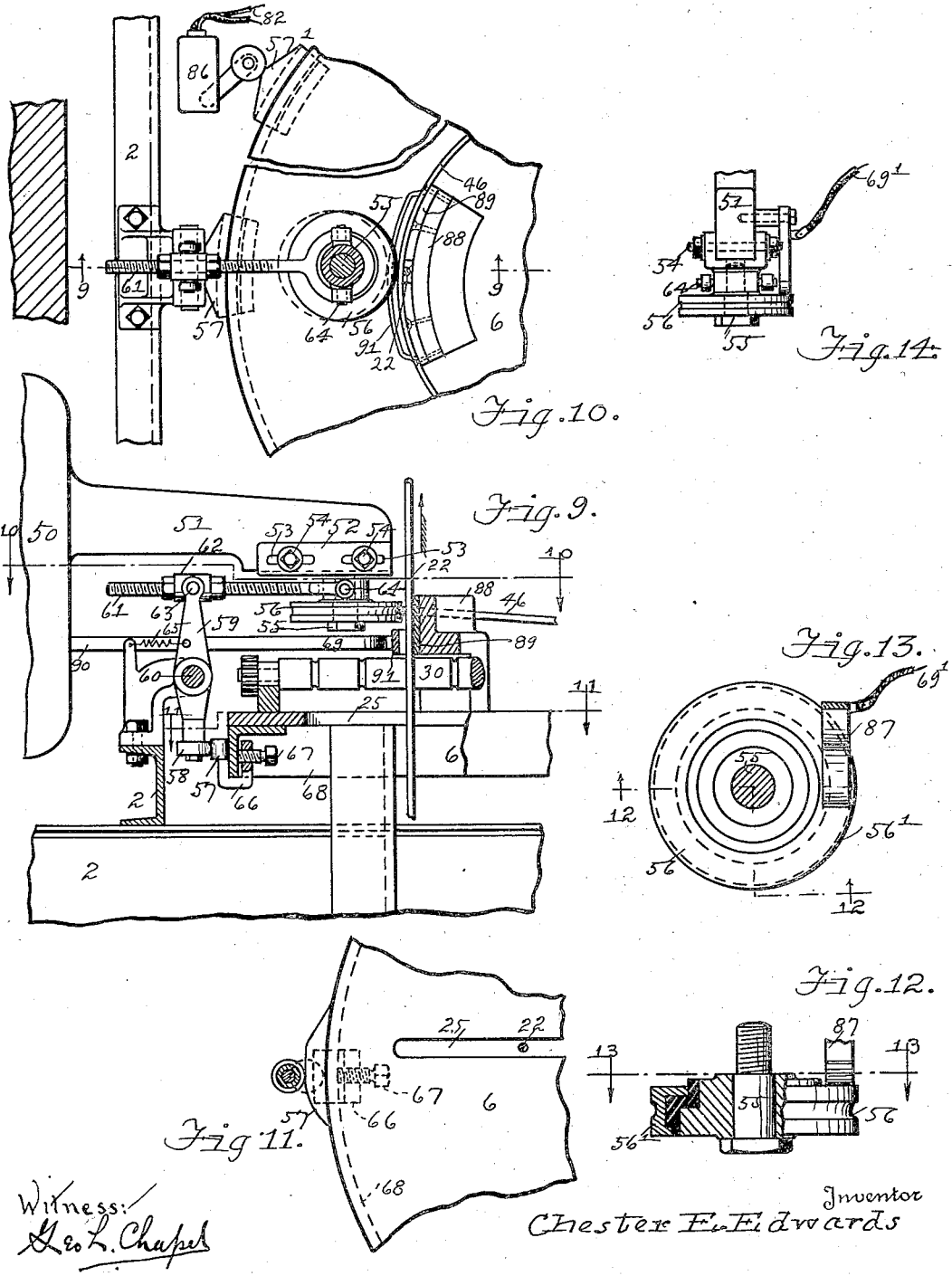

Aug. 11, 1936.     C. E. EDWARDS     2,050,832
MACHINE FOR MAKING RETICULATED WIRE STRUCTURES
Filed Sept. 12, 1934     12 Sheets-Sheet 7

Witness:
Geo L. Chapel

Inventor
Chester E. Edwards
By Rice and Rice
Attorneys

Aug. 11, 1936.   C. E. EDWARDS   2,050,832
MACHINE FOR MAKING RETICULATED WIRE STRUCTURES
Filed Sept. 12, 1934   12 Sheets-Sheet 8
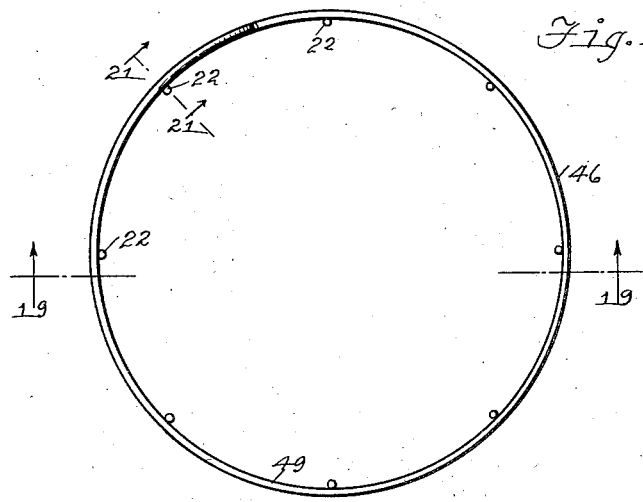
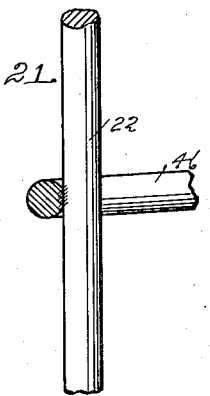
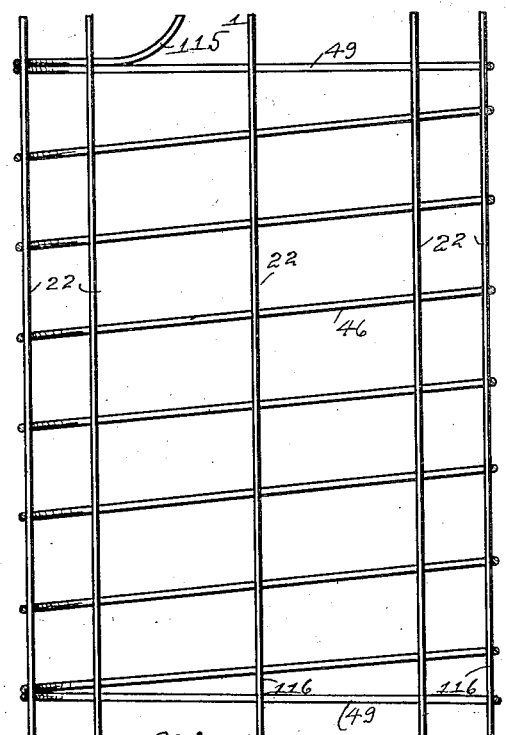
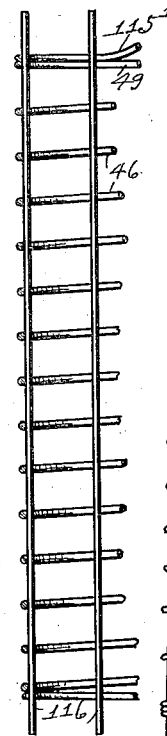
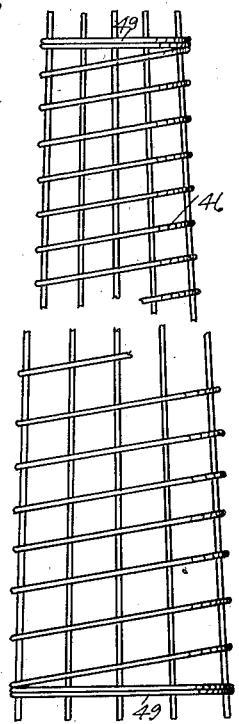
Inventor
Chester E. Edwards
By Rice and Rice
Attorneys
Witness:
Geo. L. Chapel

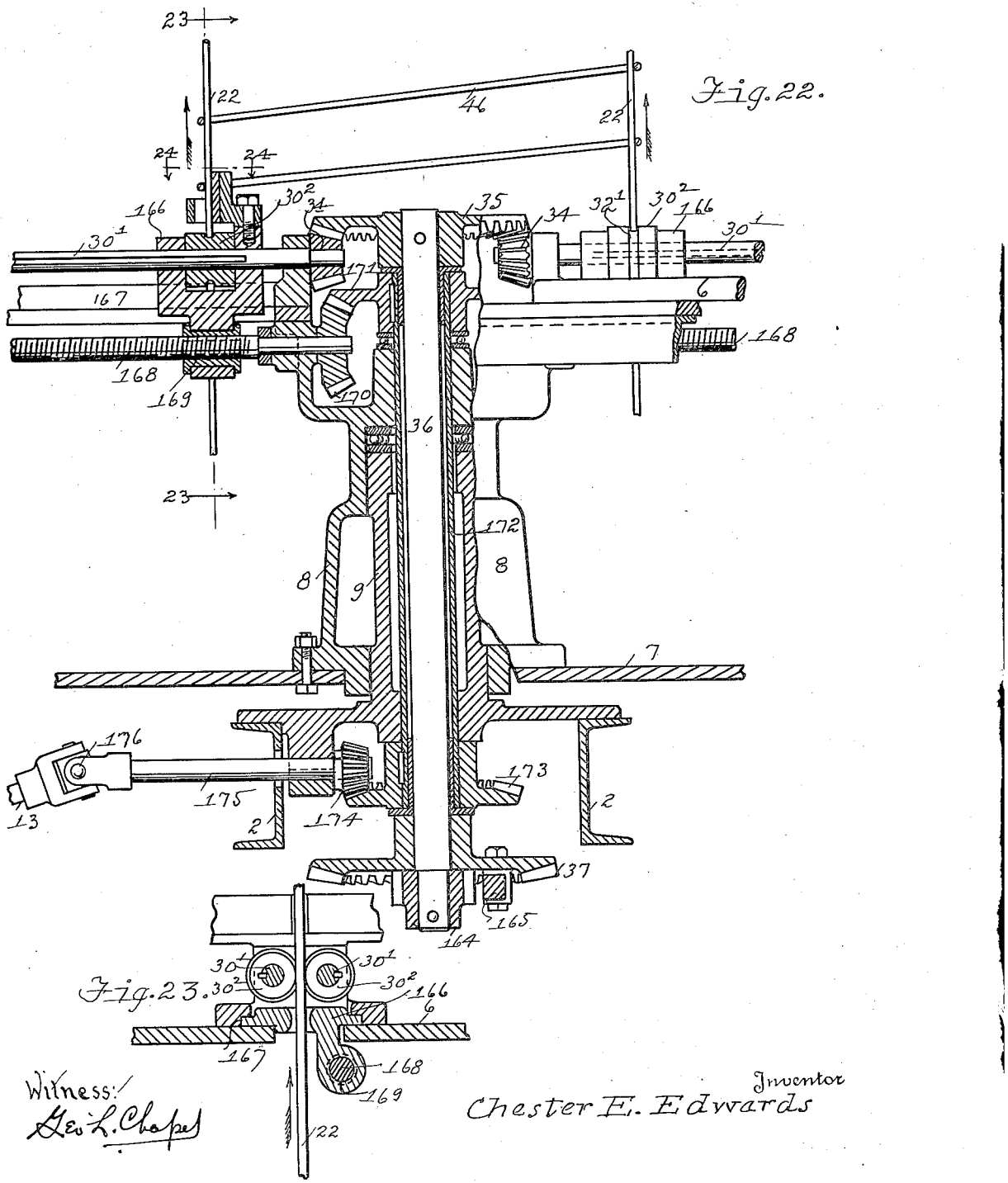

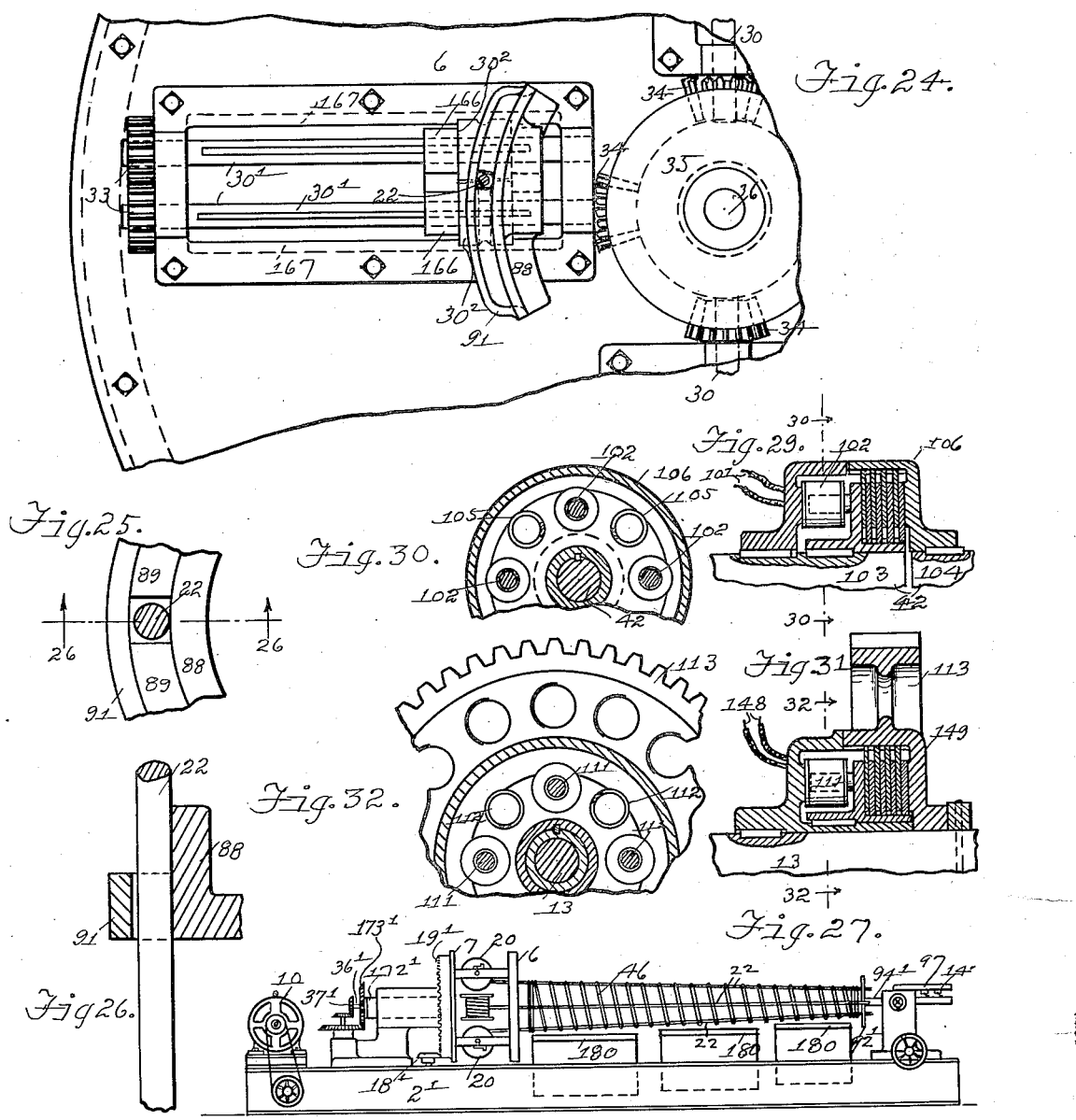

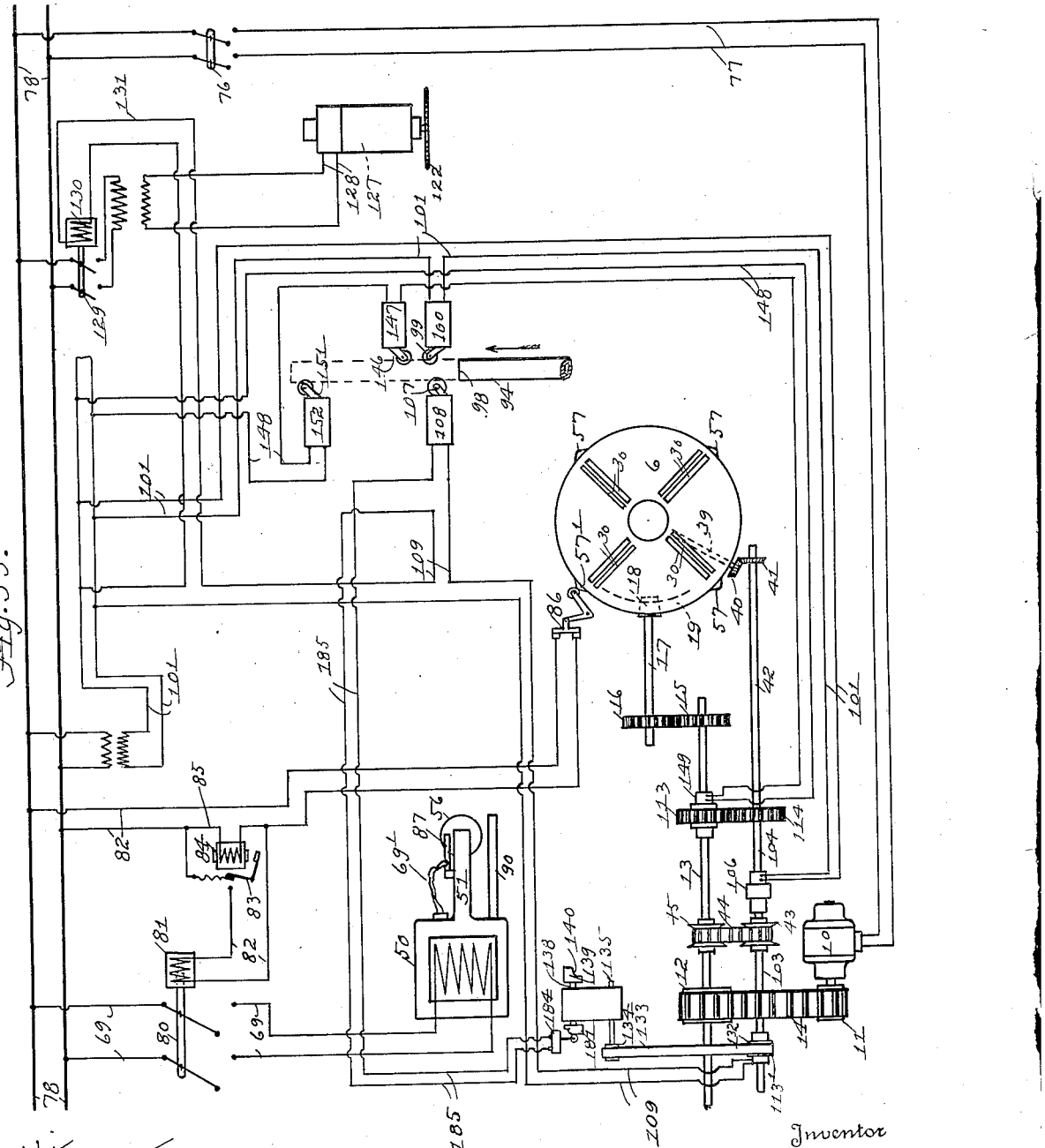

Aug. 11, 1936.   C. E. EDWARDS   2,050,832
MACHINE FOR MAKING RETICULATED WIRE STRUCTURES
Filed Sept. 12, 1934   12 Sheets—Sheet 12
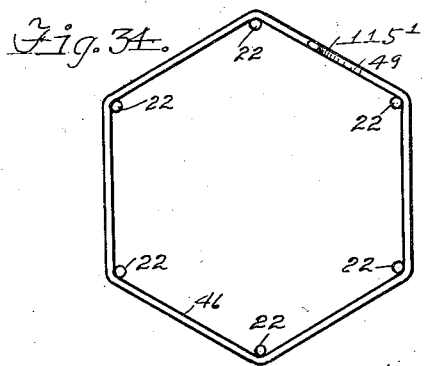
Fig. 34.
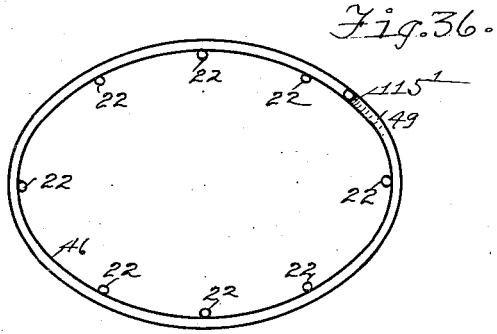
Fig. 36.
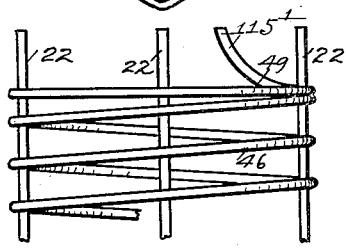
Fig. 35.
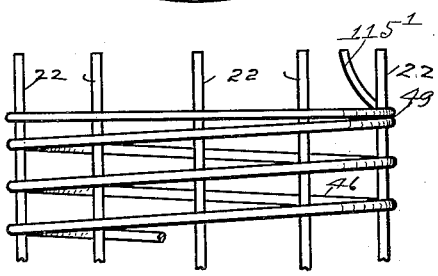
Fig. 37.
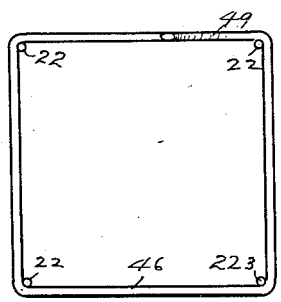
Fig. 38.
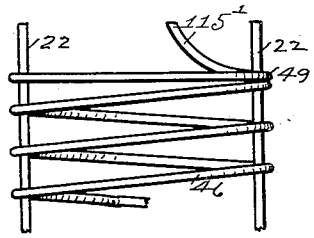
Fig. 39.
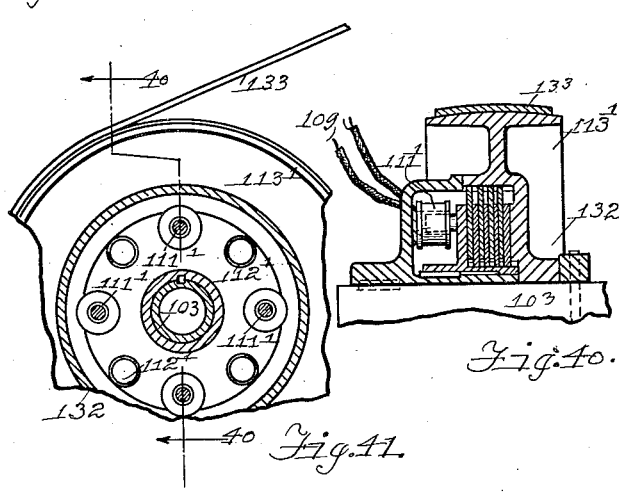
Fig. 40.
Fig. 41.
Witness:
Geo. L. Chapel
Inventor
Chester E. Edwards
By Rice and Rice
Attorneys Patented Aug. 11, 1936

2,050,832

UNITED STATES PATENT OFFICE 2,050,832

MACHINE FOR MAKING RETICULATED WIRE STRUCTURES

Chester E. Edwards, East Grand Rapids, Mich., assignor to Lamar Pipe and Tile Company, Grand Rapids, Mich., a corporation of Michigan Application September 12, 1934, Serial No. 743,640

22 Claims. (Cl. 140—71)

The present invention relates to machines for making reticulated wire structures; and its object is to provide such a machine whereby a wire may be wound around a plurality of spaced wires fed longitudinally; and further, to provide such a machine whereby a wire may be wound helically around such spaced wires; and further, to provide such a machine whereby a wire may be wound around a plurality of wires alternately helically and at right angles thereto; and further, to provide in such a machine means for uniting the wound wire with the other wires respectively; and further, to provide in such a machine means for severing the wires to separate successively formed structures; and further, to provide means for forming such reticulated structures of tapered form; and further, to provide such a machine having parts and combinations thereof and certain specific parts whereby these objects are attained; and further, to provide an electrical organization whereby such parts are operated and controlled to attain such objects.

These and any other and more specific objects hereinafter appearing are attained by, and the invention finds preferable embodiment in, the illustrative machine and organization, mechanical and electric, described in the body of this specification and shown by the accompanying drawings, in which:—

Figure 1 is an elevational front view of a machine for making reticulated cylindrical structures;

Figure 2 is an elevational left hand side view thereof, partially sectioned on line 2—2 of Figures 1 and 3;

Figure 3 is a horizontal sectional view of the same taken on line 3—3 of Figure 4 showing certain lower parts of the machine in top plan;

Figure 6 is a horizontal sectional view thereof taken on line 6—6 of Figure 4;

Figure 7 is a detail vertical sectional view of certain parts of the same taken on line 7—7 of Figure 6;

Figure 8 is a detail top view of said parts, a wire of the structure being sectioned on line 8—8 of Figure 7;

Figure 9 is a detail vertical sectional view of parts of the machine for welding the wires of the structure together, taken on line 9—9 of Figure 10;

Figure 10 is a horizontal sectional view of said parts taken on line 10—10 of Figure 9;

Figure 11 is a horizontal sectional view thereof taken on line 11—11 of Figure 9;

Figure 12 is a side view of some of said parts partially sectioned on line 12—12 of Figure 13;

Figure 13 is a horizontal sectional view thereof taken on line 13—13 of Figure 12;

Figure 14 is an elevational view of certain parts shown in Figures 9, 10, 12 and 13;

Figure 18 is an end view of the structure;

Figure 19 is a side view thereof sectioned on line 19—19 of Figure 18;

Figure 20 is a view similar to the left hand side portion of Figure 19 but showing twice as many wire coils in the same axial space;

Figure 21 is a detail view (enlarged) of a portion of said structure sectioned on line 21—21 of Figure 18;

Figure 22 is an axial sectional view of a modified construction of the machine for making a tapered structure;

Figure 23 is a vertical sectional view of parts thereof taken on line 23—23 of Figure 22;

Figure 24 is a top plan view of parts of the same, a wire of the structure being sectioned on line 24—24 of Figure 22;

Figure 25 is a detail top view of parts of the same;

Figure 26 is a vertical sectional view thereof taken on line 26—26 of Figure 25;

Figure 27 is an elevational side view of a modified construction of the machine wherein the structure is axially horizontal;

Figure 28 is a side view of a tapered form of the structure;

Figure 29 is an axial sectional view of parts of a magnetic clutch;

Figure 30 is a transverse sectional view thereof taken on line 30—30 of Figure 29;

Figure 31 is an axial sectional view of parts of another magnetic clutch;

Figure 32 is a transverse sectional view thereof taken on line 32—32 of Figure 31;

Figure 33 is a diagrammatic view of electrical instruments and connections whereby the machine and its parts are operated;

Figures 34, 36 and 38 are end views of various forms of wire structures that may be made on the machine;

Figures 35, 37 and 39 are side views of said structures respectively;

Figure 40 is an axial sectional view of parts of another magnetic clutch taken on line 40—40 of Figure 41;

Figure 41 is a transverse sectional view thereof.

Figure 5:
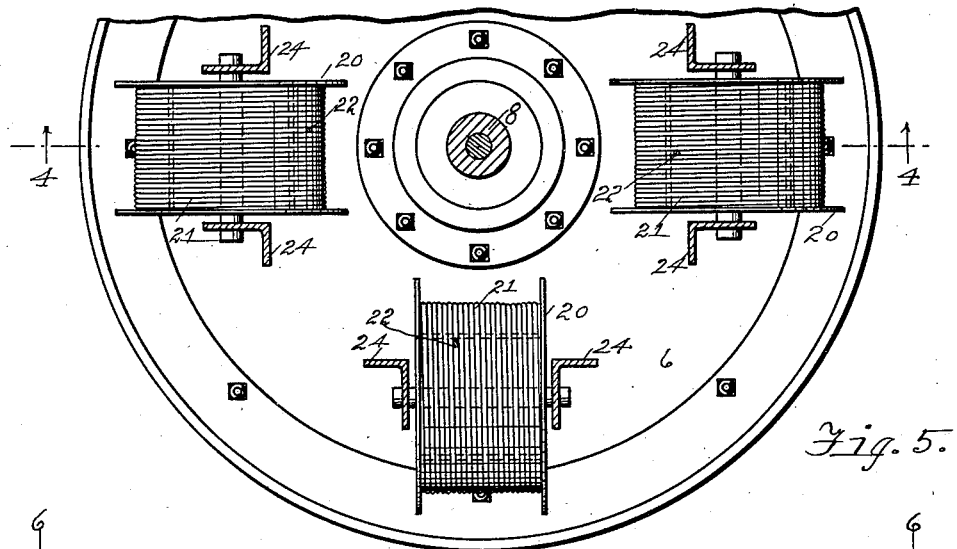
Figure 5 is a horizontal sectional view thereof taken on line 5—5 of Figure 4.

In these drawings is illustrated a machine for making reticulated cylindrical wire structures or "cages" adapted for use as metallic reinforcements to be embodied in concrete columns, pipes and the like. This machine has a frame mounted on a suitable base 1 and including horizontal beams 2 supporting a pair of posts 3 connected adjacent their upper ends by cross bars 4 and braced at 5.

A circular carrier comprising upper and lower platform 6, 7 mounted on a hollow hub portion 8 is rotatable on a hollow vertical standard 9 by suitable means, as by the motor 10 whose shaft has a pulley 11 which with a pulley 12 on a shaft 13 carries a belt 14, the shaft 13 having a gear 15 meshing with gear 16 on a short shaft 17 whose other gear 18 meshes with the large gear 19 on the under side of platform 7 as indicated in Figures 1 and 3.

Spools 20 carrying the desired number (four in the construction shown in most of the views) of coils 21 of wire for forming those members 22 of the structure which extend lengthwise thereof are turnable in bearings 23 in the posts 24 connecting said platforms, these spools being disposed at angularly spaced positions about said hub portion. These wires 22 extend upwardly through radial slots 25 in the upper platform being guided by annularly grooved rolls 26 journalled at 27 on blocks 28 which are adjustably held by set screws 29 in proper position in the slots (see Figure 4). Said wires are drawn upwardly by and between a pair of parallel shafts 30 journalled at 31 on the upper platform 6, these shafts having annular grooves 32 in which the wires are tightly engaged (see Figures 6, 7, 8).

These parallel shafts have meshing gears 33 and are rotated to draw the wires upwardly by means of their gears 34 which mesh with a gear 35 on a vertical shaft 36 extending through the hub portion 8 and having a gear 37 at its lower end with which meshes the gear 38 of a shaft 39 whose other gear 40 meshes with a gear 41 on shaft 42 having a pulley 43 which carries a belt 44 carried also by a pulley 45 on the driving shaft 13.

The machine is driven by the motor 10 in an electric circuit 77 branching from the main circuit 78 and having the controlling switch 76 (Figure 33).

In the machine's operation said structures or cages are made successively, as cage 113A and then cage 113B and so on (Figures 1, 2, 15, 16) and each cage when formed is severed from the next cage in process of formation. In most of the cage-forming operation, the motor 10 being energized, the carrier is rotated as above described so that the wire 46 coiled on a spool 47 rotatably mounted at 48 at one side of the carrier (Figure 17) is wound around all of the wires 22, and simultaneously therewith the parallel shafts 30 are rotated as above described to draw these wires upwardly whereby the wire 46 is wound around them in a helical direction as shown in the views. An electric welder indicated at 50 has an arm 51 extending toward the axis of the carrier's rotation (Figures 1, 2, 3).

A block 52 has slots 53 through which extend bolts 54 secured to said arm to provide a slide bearing for the block (Figure 9). This block has a downwardly extending spindle 55 on which a grooved welding wheel 56 is rotatably mounted. The block is slid toward the axis of the carrier whenever its rotation carries one of the wires 22 into the field of the welding operation, such sliding movement urging wheel 56 into contact with wire 46 and pressing it tightly on said registering wire 22 to weld the two wires together at their point of crossing. A cam 57 on the periphery of the carrier's platform 6 contacts a roll 58 on the lower arm of a lever 59 fulcrumed at 60 on the frame and swings this lever so that the rod 61 threaded for adjustment in a sleeve 62 pivoted at 63 on the lever's upper arm, this rod being pivoted at 64 on the block 52, and the rod thus slides the block; and immediately the welding operation is performed the roll rides down off said cam, and the block 52 and wheel 56 are retracted by the spring 65.

One of these cams is provided for, and corresponds in position with, each wire 22, there being four such cams and four wires 22 shown in most of the views. These cams are secured in properly adjusted angular positions as by their U-shaped members 66 having set screws 67 engaging the flange 68 of the carrier's upper platform 6 as shown in Figure 9. The electric welder 50 is energized to transmit current to the wheel 56 for welding, through the circuit 69 branching from main circuit 78 and having a normally open switch 80 (Figure 33) closed by the electromagnet or solenoid 81 in the circuit 82 branching from the main circuit and having a time switch 83 operated by an electro-magnet or solenoid 84 in circuit 85 branching from circuit 82, said circuit 82 having a normally open controlling switch indicated at 86. This switch is closed by a cam $57^1$ on the periphery of platform 6 adjusted to proper angular position thereon to operate the welder when any of the wires 22 is carried to welding position with the wire 46.

Figure 17:
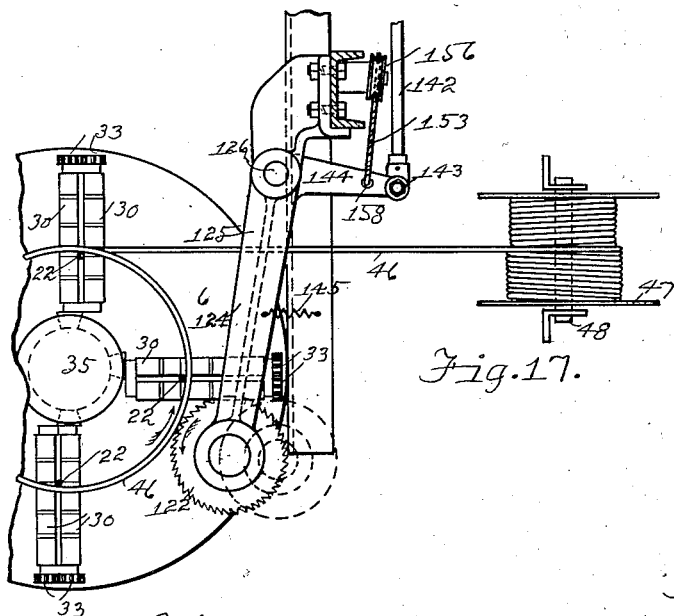
Figure 17 is a plan view of the same partially sectioned on line 17—17 of Figure 16.
Figure 16:
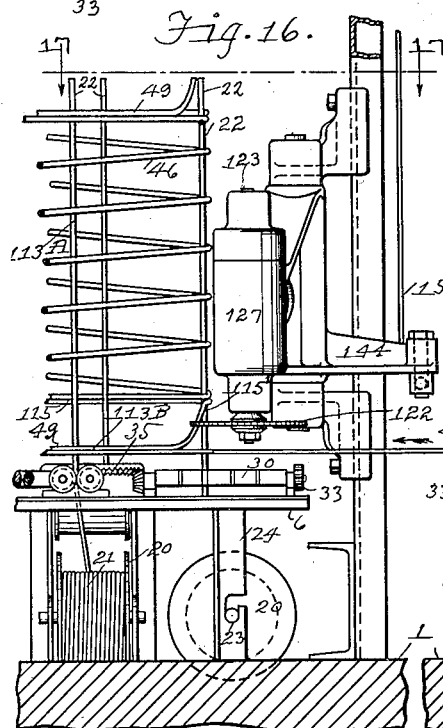
Figure 16 is an elevational side view thereof.
Figure 15:
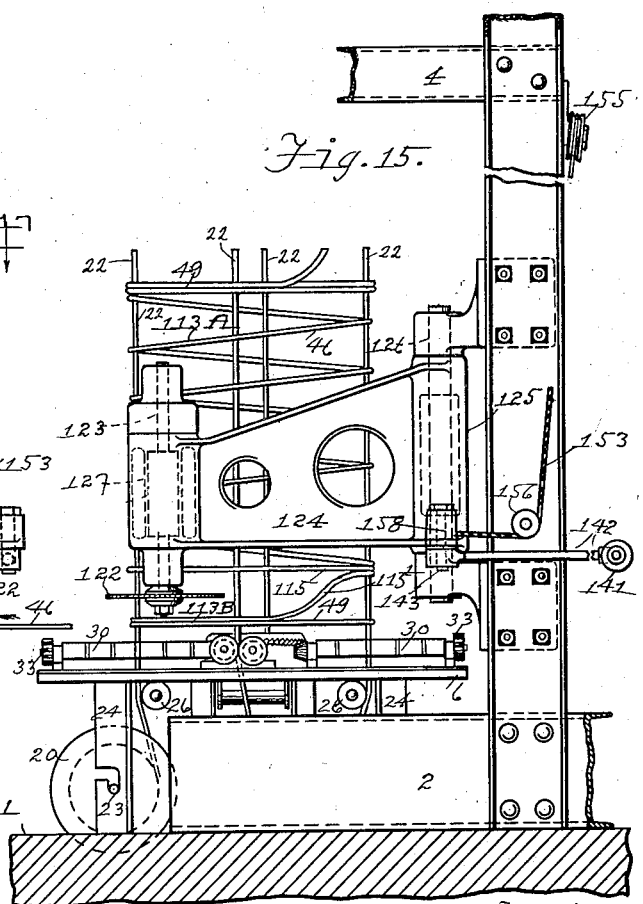
Figure 15 is an elevational view of parts of the machine showing means for severing wires of the structure.

A brush 87 on wiring $69^1$ extending from the welder contacts the welding wheel's grooved periphery $56^1$ (of copper or the like conductor) for electrifying the crossing wires to weld the same together (Figure 13). An arcuate upward extension 88 of platform 6 carries a peripheral plate 89 (of copper or like) engaging the inner side of the wire 22 and carries the current through a parallel plate 91 to the grounding wire 90 (Figures 9 and 10). The cam $57^1$ is the same cam 57 whereby the welding of the next wire 22 is effected. When a portion of the wires have thus been formed and united to provide a cage 113A of desired length, the upper end 49 of cage 113A rising under the action of the parallel shafts 30 strikes and raises the cross bar 92 of a rod 93 slidable to adjusted positions in the vertical tube 94 in which positions the rod is held by a set screw 95, said rod also bearing at 96 in the machine's upper bar 4. This tube turns and slides in a bearing 97 in the machine's bar 4 (Figures 1 and 2). When the tube 94 is thus raised far enough its upper end 98 strikes the arm 107 of a normally open switch indicated at 108 in circuit 109 branching from circuit 101 and closes this switch and branch circuit containing the electromagnetic clutch 132 (illustrated in Figures 40, 41) energizing its solenoid or magnet $111^1$ to couple this clutch's pulley 132 with portion 103 of shaft 42. This pulley and pulley 134 on a shaft 135 carry a belt 133 (Figure 3), and the speed-reducing gears indicated at 136, 137 on shafts 135 and 138 rotate the cam wheel 139 (on shaft 138) having an end cam 140 on which rides the roll 141 on a rod 142 whose opposite end is pivoted at 143 on the short arm 144 of a bell crank lever fulcrumed vertically at 126 on the frame and carrying the circular saw 122 on said lever's arm 124 (Figures 15, 16, 17). The rotation of shaft 138 and its cam wheel 139 thus swings said lever's arm 124 and the saw slowly toward the cage on the carrier. Suitable means are provided for farther raising the tube 94, such means as illustrated comprising a cable 153 carried on pulleys 154, 155, 156 on the frame and attached at its upper end to the tube 94 at 157 and at its lower end to the arm 144 of lever 125 at 158, so that the swinging of this lever to carry the saw toward the cage draws this cable thus raising the tube. At practically the same time that switch 108 operates as above explained the rising tube 94 strikes arm 99 of a normally closed switch indicated at 100 in circuit 101 branching from the main circuit and opens this switch and circuit 101 containing the electromagnetic clutch 106 (illustrated in Figures 29, 30) thus deenergizing its electromagnets 102 and uncoupling the aligned portions 103, 104 of shaft 42 against the pressure of the coiled springs 105, so that the parallel shafts 30 cease rotating to draw the wires 22 upwardly, and wire 46 is thus wound around these wires 22 in a plane at right angles to the axis of the carrier to form the bottom portion, coil or turn 115 of the upper cage 113A.

The closing of switch 108 to swing the saw-carrying bell crank lever by means of the cam wheel 139, etc. raises the tube 94 into engagement with arm 146 of a normally open switch indicated at 147 in circuit 148 branching from circuit 101 and closes this switch and branch circuit containing the electromagnetic clutch 149 (illustrated in Figures 31, 32) and energizes its solenoid or magnet 111 to couple this clutch's gear 113 with its shaft 13, so that the parallel shafts 30 are now rotated through shaft 13 and its gear 113 meshing with gear 114 on portion 104 of shaft 42 (Figures 3, 33). This rotation of parallel shafts 30 through said gears 113, 114 is arranged to be faster than through portions 103, 104 of shaft 43 when coupled, so that the wires 22 are now drawn upwardly much faster than by the previous rotation of shafts 30, in order to provide a "jump" or considerable space between the bottom coil 115 of cage 113A and the top portion 49 of the succeeding cage 113B below it, as shown in Figures 15, 16 and the connection 115¹ (a portion of wire 46 connecting the two cages) extends inclinedly downwardly as seen in these views. This "jump" between the cages is completed when the tube 94 strikes arm 151 of a normally closed switch indicated at 152 in circuit 148 and opens it thus unclutching clutch 149 and uncoupling gear 113 from shaft 13, so that the parallel shafts 30 again cease to rotate, and thus the wire 46 is wrapped around wires 22 in a plane at right angles to the carrier's axis to form the top portion 49 of the lower cage 113B.

The circular saw 122 is journalled vertically at 123 on arm 124 of the bell crank lever 125 (Figures 15, 16, 17) and is rotated by a motor indicated at 127 in the free end of the lever arm 124 and in a circuit 128 branching from the main circuit. Circuit 128 has a switch 129 closed by the electromagnet 130 in circuit 131 branching from circuit 101, 109. When the clutch 132 is operated by closing circuit 109 the saw begins to rotate and the lever arm 124 begins to swing slowly toward the axis of the carrier as above explained.

While the wire 46 is being wound around wires 22 and welded thereto successively to form said top portion 49 of cage 113B, the saw is moving inwardly into cutting engagement with wires 22 and the connection 115¹ to sever the same in succession as the carrier rotates. The finished cage 113A is now removed from the carrier while the tube 94 is held suspended by the cable 153, and the cam wheel 181 on shaft 138 having the end cam 182 turns to a position wherein the arm 183, of a normally closed switch indicated at 184, rides down this cam to open circuits 185, 109, 131 and 128.

The tube 94 and parts carried thereby are thus permitted to descend by means of gravity and of the spring 145 swinging lever 125 to retract the saw, and the machine's parts are returned to initial position.

Various adjustments of this machine may be made. To form a cage of greater or less diameter the wires 22 may be inserted in grooves 32 farther from or nearer to the axis of the carrier; and cages elliptical in cross section may be formed by inserting one pair of said wires in the grooves of one pair of opposite shafts 30 and another pair of wires in grooves of the other pair of shafts, the grooves of one pair of opposite shafts being nearer said axis than the grooves of the other pair of opposite shafts (Figure 6). The pitch of the helical winding of wire 46 may be varied by changing the relative speed of rotation of the carrier and of the parallel shafts 30, as by forming the pulley 45 in two conical halves so that they may be adjusted axially relatively to each other in the same manner indicated in pulley 11 having conical halves 160 adjustable axially by the spring 161 on the motor's shaft (Figure 3).

Figure 4:
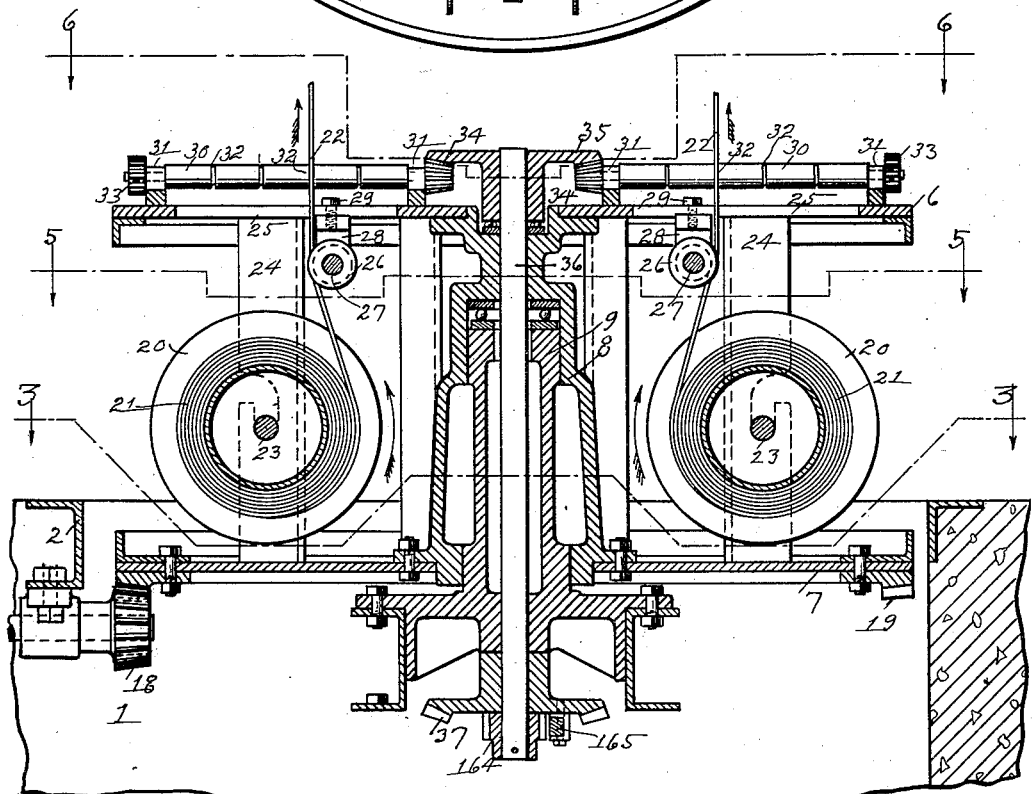
Figure 4 is a vertical axial sectional view of certain parts taken on line 4—4 of Figures 3 and 5.

The welder 50 may be adjusted to different positions relatively to the carrier's axis to accommodate cages of different diameters by moving it on a horizontal track 162 by means of the screw 163 (Figures 1, 3); and the sliding movement of the block 52 carrying the welding wheel 56 may be varied by the threaded rod 61 (Figures 9, 10). A ratchet wheel 164 and detent 165 permits the carrier to be reversely turned when desired (Figures 4, 22).

In Figures 22, 23, 24 is illustrated a modified construction of the machine whereby a tapered structure or cage such as is shown in Figure 28 may be made. In this construction the parallel shafts 30¹ rotate in blocks 166 slidable in radial grooves 167 in the carrier's platform 6. These blocks have wheels 30² rotatable therein and splined on the shafts 30¹. Said wheels have the annular grooves 32¹ in which the wires 22 are engaged. These blocks are all slid in the grooves 167 by radial shafts 168 threaded at 169 in the blocks and having gears 170. These gears mesh with a gear 171 on sleeve 172 rotatable in the hub portion 8 and surrounding the shaft 36. This sleeve is rotated by suitable connections as its gear 173 meshing with gear 174 on shaft 175 connected by a knuckle joint 176 with the driving shaft 13 (Figures 3, 22).

As the threaded shafts 168 are thus rotated the wires 22 are progressively moved outwardly at their lower portions where wire 46 is wound around them and a cage is formed which tapers upwardly.

In Figure 27 another modified construction is illustrated wherein its axis is horizontal in the forming thereof and the cage is tapered. The axially horizontal carrier has the platforms 6, 7 and spools 20 from which the wires 22 are drawn. Coaxial rotating members 36¹ and 172¹ corresponding to shaft 36 and sleeve 172 of Figure 22 have gears 37¹, 173¹ which are driven through suitable connections by the motor 10, the carrier being driven by gears 18¹, 19¹. A tube 94¹ and cross bar 92¹ similar to corresponding parts shown in other views serve to operate this modified construction in like manner. Shelves 180 are provided to receive the severed cages. Figures 34, 35 show a modified construction in which there are six wires 22 on which the wire 46 is bent to form angles at the wires 22; Figures 38, 39 show a modified construction in which the wire 46 is bent to form angles on the four wires 22; and Figures 36, 37 show another modified construction in which the wire 46 is wound elliptically around eight wires 22.

The invention being intended to be pointed out in the claims, is not to be limited to or by details of construction of any particular embodiment thereof illustrated by the drawings or hereinbefore described.

I claim:

1. In a machine for making reticulated wire structures: a rotatable carrier; a plurality of means mounted on the rotatable carrier spaced angularly about its axis for feeding wires in the carrier's axial direction; means for rotating the carrier to wind a wire around the first-mentioned wires.

2. In a machine for making reticulated wire structures: a rotatable carrier; a plurality of means on the carrier spaced angularly about its axis for feeding wires respectively in the carrier's axial direction; means for rotating the carrier to wind a wire around the first-mentioned wires; means actuated in connection with the rotation of the carrier for uniting the last-mentioned wire with each of the first-mentioned wires.

3. In a machine for making reticulated wire structures: a rotatable carrier; a plurality of means on the carrier spaced angularly about its axis for feeding wires in the carrier's axial direction; means for simultaneously rotating the carrier and operating the feeding means to wind a wire helically around the first-mentioned wires; means for rotating the carrier, alternately with the simultaneous operation of the feeding means and the rotation of the carrier, to wind the second-mentioned wire around the first-mentioned wires in a plane at right angles to the carrier's axis.

4. In a machine for making reticulated wire structures: a rotatable carrier; a plurality of means on the carrier spaced angularly about its axis for feeding wires in the carrier's axial direction; means for simultaneously rotating the carrier and operating the feeding means to wind a wire helically around the first-mentioned wires; means operating in connection with the carrier's rotation for severing the wires in a direction transverse the carrier's axis.

5. In a machine for making reticulated wire structures: a rotatable carrier; a plurality of means on the carrier spaced angularly about its axis for feeding wires in the carrier's axial direction; means for rotating the carrier to wind a wire around the first-mentioned wires in a plane at right angles to the carrier's axis; means for then simultaneously rotating the carrier and operating the feeding means; means for then rotating the carrier for again winding the second-mentioned wire around the first-mentioned wires in a plane at right angles to the carrier's axis; means operating in connection with the rotation of the carrier for severing the wires between the portions of the second-mentioned wire which are wound in said planes.

6. In a machine for making reticulated wire structures: a rotatable carrier; a plurality of means on the carrier spaced angularly about its axis for feeding wires in the carrier's axial direction; means for simultaneously rotating the carrier and operating the feeding means to wind a wire helically about the first-mentioned wires; means for then rotating the carrier to wind the second-mentioned wire around the first-mentioned wires in a plane at right angles to the carrier's axis; means for then simultaneously rotating the carrier and operating the feeding means; means for then rotating the carrier to again wind the second-mentioned wire around the first-mentioned wires in a plane at right angles to the carrier's axis; means for then simultaneously rotating the carrier and operating the feeding means to again wind the second-mentioned wire helically about the first-mentioned wires.

7. In a machine for making reticulated wire structures: a rotatable carrier; a plurality of means on the carrier spaced angularly about its axis for feeding wires in the carrier's axial direction; means for simultaneously rotating the carrier and operating the feeding means to wind a wire helically about the first-mentioned wires; means for then rotating the carrier to wind the second-mentioned wire around the first-mentioned wires in a plane at right angles to the carrier's axis; means for then simultaneously rotating the carrier and operating the feeding means at increased speed; means for then rotating the carrier to again wind the second-mentioned wire around the first-mentioned wires in a plane at right angles to the carrier's axis; means for then simultaneously rotating the carrier and operating the feeding means to again wind the second-mentioned wire helically about the first-mentioned wires.

8. In a machine for making reticulated wire structures: a rotatable carrier; a plurality of means on the carrier spaced angularly about its axis for feeding wires in the carrier's axial direction; means for rotating the carrier to wind a wire around the first-mentioned wires, said feeding means comprising pairs of rotatable parallel shafts feedingly engaging the first-mentioned wires therebetween.

9. In a machine for making reticulated wire structures: a rotatable carrier; a plurality of means on the carrier spaced angularly about its axis for feeding wires in the carrier's axial direction; means for rotating the carrier to wind a wire around the first-mentioned wires, said feeding means comprising pairs of rotatable parallel shafts having axially spaced registering annular grooves wherein the first-mentioned wires are feedingly engaged.

10. In a machine for making reticulated wire structures: a rotatable carrier; a plurality of means on the carrier spaced angularly about its axis for feeding wires in the carrier's axial direction; means for rotating the carrier to wind a wire around the first-mentioned wires; means actuated in connection with the rotation of the carrier for uniting the last-mentioned wire with each of the first-mentioned wires comprising an electric welder movable in connection with the rotation of the carrier into operative position with the wires at their crossing points respectively.

11. In a machine for making reticulated wire structures: a rotatable carrier; a plurality of means on the carrier spaced angularly about its axis for feeding wires in the carrier's axial direction; means for rotating the carrier to wind a wire around the first-mentioned wires; means actuated in connection with the rotation of the carrier for uniting the last-mentioned wire with each of the first-mentioned wires; means operating in connection with the carrier's rotation for severing the wires in a direction transverse the carrier's axis.

12. In a machine for making reticulated wire structures: a rotatable carrier; a plurality of means on the carrier spaced angularly about its axis for feeding wires in the carrier's axial direction; means for simultaneously rotating the carrier and operating the feeding means to wind a wire helically around the first-mentioned wires; means operating in connection with the carrier's rotation for severing the wires comprising a rotatable cutter mounted for bodily movement in a plane at right angles to the carrier's axis.

13. In a machine for making reticulated wire structures: a rotatable carrier; a plurality of means on the carrier spaced angularly about its axis for feeding wires in the carrier's axial direction, comprising pairs of rotatable shafts with rolls splined thereon feedingly engaging said wires therebetween; means for rotating the carrier to wind a wire around the first-mentioned wires and for rotating the shafts and moving the rolls axially thereof simultaneously with the carrier's rotation to form a tapered structure.

14. In a machine for making reticulated wire structures: a rotatable carrier; a plurality of means on the carrier spaced angularly about its axis for feeding wires in the carrier's axial direction; means for rotating the carrier to wind a wire around the first-mentioned wires; means operating in connection with the carrier's rotation for severing the wires to form axially successive structures; means actuated by the feeding means for operating the feeding means alternately with the carrier's rotation; means actuated by the feeding means for operating the wire-severing means.

15. In a machine for making reticulated wire structures: a rotatable carrier; a plurality of means on the carrier spaced angularly about its axis for feeding wires in the carrier's axial direction; means for rotating the carrier to wind a wire around the first-mentioned wires; means actuated in connection with the rotation of the carrier for uniting the second-mentioned wire with the first-mentioned wires respectively; means operating in connection with the carrier's rotation for severing the wires to form axially successive structures; means actuated by the feeding means for operating the feeding means alternately with the carrier's rotation; means actuated by the feeding means for operating the wire-severing means.

16. In a machine for making reticulated wire structures: a rotatable carrier; a plurality of means on the carrier spaced angularly about its axis for feeding wires in the carrier's axial direction; means for normally rotating the carrier and simultaneously operating the feeding means to wind a wire helically about the first-mentioned wires; means for alternately rotating the carrier and operating the feeding means; means for operating the feeding means at alternately different speeds; an element engaged and moved by the structure in its axial movement caused by the feeding means; an electric circuit comprising branches containing and operating rotating and feeding means and having controlling switches in the path of the movement of said element and adapted to be engaged and operated thereby, one of said switches being operated by said element in one of its moved positions to stop the operation of the feeding means, another of said switches being operated by said element in another moved position to operate the feeding means at increased speed, and another of said switches being operated by said element in another moved position to stop the operation of the feeding means.

17. In a machine for making reticulated wire structures: a rotatable carrier; a plurality of means on the carrier spaced angularly about its axis for feeding wires in the carrier's axial direction; means for normally rotating the carrier and simultaneously operating the feeding means to wind a wire helically about the first-mentioned wires; means for severing the wires to form axially successive structures, comprising a rotatable cutter mounted for bodily movement in a direction transverse said axis; means for alternately rotating the carrier and operating the feeding means; means for operating the feeding means at alternately different speeds; an element engaged and moved by the structure in its axial movement caused by the feeding means; an electric circuit comprising branches containing and operating the rotating means, the feeding means and the severing means and having controlling switches in the path of said element and adapted to be engaged and operated thereby, one of said switches being operated by said element in one of its moved positions to stop the operation of the feeding means and another of said switches being operated by said element to bodily move the severing means inwardly toward the structure on the carrier, another of said switches being operated by said element in another moved position to operate the feeding means at increased speed, and another of said switches being operated by said element in another moved position to stop the rotating means, the operation of the feeding means and said movement of the severing means.

18. In a machine for making reticulated wire structures: a rotatable carrier; a plurality of means on the carrier spaced angularly about its axis for feeding wires in the carrier's axial direction; means for normally rotating the carrier and simultaneously operating the feeding means to wind a wire helically about the first-mentioned wires; means for severing the wires to form axially successive structures, comprising a rotatable cutter mounted for bodily movement in a direction transverse said axis; means for alternately rotating the carrier and operating the feeding means; means for operating the feeding means at alternately different speeds; an element engaged and moved by the structure in its axial movement caused by the feeding means; an electric circuit comprising branches containing and operating the rotating means, the feeding means and the severing means and having controlling switches in the path of said element and adapted to be engaged and operated thereby, one of said switches being operated by said element in one of its moved positions to stop the operation of the feeding means and another of said switches being operated by said element to bodily move the severing means inwardly toward the structure on the carrier, another of said switches being operated by said element in another moved position to operate the feeding means at increased speed, and another of said switches being operated by said element in another moved position to stop the rotating means, the operation of the feeding means and said movement of the severing means; connections between the severing means and said element for supporting the same in raised position in the inwardly moved position of the severing means.

19. In a machine of the character described: a rotatable carrier; a plurality of feeding means on the carrier spaced angularly about its axis for thrusting wires in the carrier's axial direction; means for simultaneously rotating the carrier and operating the feeding means for winding a wire around the first-mentioned wires helically; an electric welder for welding the second-mentioned wire on the first-mentioned wires respectively during the rotation of the carrier and the operation of the feeding means.

20. In a machine for making approximately cylindrical reticulated wire structures: a carrier; feeding means for thrusting from the carrier at least three wires in the carrier's axial direction along lines spaced angularly about the carrier's axis; means for winding a wire around the projected first-mentioned wires, said last-mentioned means and the carrier being rotatable relatively to each other about said axis to thus effect such winding.

21. In a machine for making approximately cylindrical reticulated wire structures: a rotatable carrier; feeding means carried thereby for thrusting therefrom at least three wires along lines spaced angularly about the carrier's axis; means for winding a wire around the first-mentioned wires.

22. In a machine for making a reticulated structure composed of a plurality of wires extending in the axial direction of the structure and a wire wound helically around said wires; a rotatable carrier; a plurality of feeding means on the carrier spaced angularly about its axis for thrusting said plurality of wires respectively in the carrier's axial direction; means for simultaneously rotating the carrier and operating the feeding means to wind a wire helically around said plurality of wires.

CHESTER E. EDWARDS.